United States Patent
Feng et al.

(10) Patent No.: US 9,914,111 B1
(45) Date of Patent: Mar. 13, 2018

(54) SOLID-PHASE SYNTHETIC PROCEDURE FOR ATTAPULGITE-CROSSLINKED CHITOSAN COMPOSITE ADSORBENT

(71) Applicants: Wuhu Gefeng Green Technology Research Center Co., Ltd., Anhui Province (CN); Shandong Wuzhou Detection Co., Ltd., Shandong Province (CN)

(72) Inventors: Xiangdong Feng, Anhui (CN); Menglu Shi, Anhui (CN); Wengui Zhang, Anhui (CN); Huanghe Wu, Anhui (CN); Weiwei Liang, Anhui (CN); Zhifeng Lan, Anhui (CN); Jian You, Anhui (CN); Changlu Zhang, Anhui (CN)

(73) Assignees: Wuhu Gefeng Green Technology Research Center Co., Ltd., Anhui Province (CN); Shandong Wuzhou Detection Co., Ltd., Shandong Province (CN)

( * ) Notice: Subject to any disclaimer, the term of this patent is extended or adjusted under 35 U.S.C. 154(b) by 0 days.

(21) Appl. No.: 15/461,490

(22) Filed: Mar. 17, 2017

(30) Foreign Application Priority Data

Jan. 20, 2017 (CN) .......................... 2017 1 00417691

(51) Int. Cl.
| | |
|---|---|
| *B01J 20/24* | (2006.01) |
| *B01J 20/16* | (2006.01) |
| *B01J 20/30* | (2006.01) |
| *C02F 1/28* | (2006.01) |
| *C02F 101/10* | (2006.01) |

(52) U.S. Cl.
CPC ............. *B01J 20/24* (2013.01); *B01J 20/165* (2013.01); *B01J 20/3007* (2013.01); *B01J 20/3014* (2013.01); *B01J 20/3021* (2013.01); *C02F 1/281* (2013.01); *C02F 1/286* (2013.01); *C02F 1/288* (2013.01); *C02F 2101/10* (2013.01)

(58) Field of Classification Search
CPC ...... B01J 20/24; B01J 20/165; B01J 20/3007; B01J 20/3014; B01J 20/3021; C02F 1/281
USPC ......................................................... 502/401
See application file for complete search history.

(56) References Cited

U.S. PATENT DOCUMENTS

| | | |
|---|---|---|
| 6,786,336 B2 | 9/2004 | Boddu et al. |
| 8,932,983 B1 | 1/2015 | Harris et al. |

FOREIGN PATENT DOCUMENTS

| | | |
|---|---|---|
| CN | 102430398 | 5/2012 |

*Primary Examiner* — Edward Johnson
(74) *Attorney, Agent, or Firm* — JCIPRNET

(57) ABSTRACT

The present invention relates to a mercury-containing wastewater treatment technology field, in particular to an attapulgite-crosslinked chitosan composite adsorbent and its solid-phase synthetic method. The attapulgite-crosslinked chitosan composite mercury adsorbent in the invention is synthesized by the method of adding chitosan and glutaraldehyde in batches. In consideration of the limited solubility of chitosan, batch addition can not only dissolve chitosan, but also minimize the use of organic acid, resulting in less discharge of wastewater and waste gas, which is suitable for large-scale industrial production. The prepared mercury adsorbent can be applied to the removal of mercury ions in the wastewater owing to the excellent adsorptive property and regeneration performance. Meanwhile, the solid-phase synthetic procedure for preparing the mercury adsorbent is simple, easy to handle and environmental-friendly. Moreover, the product cost is greatly reduced due to the use of attapulgite.

7 Claims, No Drawings

SOLID-PHASE SYNTHETIC PROCEDURE FOR ATTAPULGITE-CROSSLINKED CHITOSAN COMPOSITE ADSORBENT

CROSS-REFERENCE TO RELATED APPLICATION

This application claims the priority benefit of China application no. 2017100417691, Jan. 20, 2017. The entirety of the above-mentioned patent application is hereby incorporated by reference herein and made a part of this specification.

DESCRIPTION

Field of the Invention

The present invention relates to an attapulgite-crosslinked chitosan composite adsorbent applied for mercury ion removal in wastewater and its solid-phase synthetic method.

Background of the Invention

Although the rapid development of industry creates huge economic benefit, it also causes serious environmental pollution. Mercury, one of the most toxic heavy metal elements in the environment, is extremely harmful to human health. Mercury pollution mainly comes from wastewater discharged by the chlor-alkali industry, plastics industry, electronics industry, gold amalgamation and others. Currently the most commonly used methods for controlling and treating mercury pollution treatment methods includes chemical precipitation, electrolysis, adsorption and so on.

Chemical precipitation method contains sulfide precipitation method, coagulation sedimentation method, metal reduction method and so forth. The precipitants generally include sodium sulfide, lime, iron, etc. This method is easy to handle. However, it may cause problems such as high hardness of water, incomplete treatment of mercury wastewater with low mercury concentration, and secondary pollution.

Electrolysis means reducing mercury ions to metallic mercury by micro-electrolysis to remove mercury ions in wastewater. This method consumes excessive energy and cannot work properly for mercury wastewater with low concentrations.

At present, adsorption is the most popular method for treatment of wastewater containing heavy metals. Particularly, adsorption method has been reported to show a good effect on mercury wastewater with low concentrations. Adsorbents used in the method can be divided into three categories: synthetic polymers, micro-organisms and natural substances. Synthetic polymers, mainly organic resins containing functional groups such as mercapto, amino, sulfonic acid, hydroxyl, etc., are capable of adsorbing mercury ions at low concentrations. Nevertheless, this kind of adsorbents is susceptible to impurities in wastewater, thus the selectivity is greatly affected. Besides, the expensive raw materials for synthesis, the complexity of synthetic technique and high prices of finished products also restrain its application in heavy metal wastewater treatment. The advantages of using microorganism as adsorbents include high adsorption rate, high selectivity, low operation cost, less waste sludge, etc., whereas it requires higher microbial tolerance since microorganism is vulnerable to heavy metal toxicity due to its biological characteristics. Moreover, other unfavorable factors such as long treatment cycle and weak ability to resist disturbance also need to be carefully considered. Natural adsorbent, usually a natural porous material with a large specific surface area, can be further modified to achieve the adsorption of mercury ions. Common natural adsorbents include activated carbon, clay, zeolite, activated alumina, chitosan and so on. Their strong points lie in convenience, meeting various environmental requirements and good regeneration ability. Nowadays, natural adsorbents have become one of the most important research directions of heavy metal adsorbents.

Owing to the large number of functional groups (acetamido, amino and hydroxyl) in the structural unit of chitosan, it is capable of adsorbing heavy metal ions. In particular, chitosan demonstrates excellent adsorptive ability to $Hg^{2+}$ after modification. Recently, a great deal of research has been conducted on chitosan materials for mercury removal, and fruitful results have been achieved. However, due to the limitation of chitosan's solubility (only dissolve in acid with a low solubility), expensive raw materials and large amount of wastewater generated during production, many studies still remain in the laboratory scale and can hardly be amplified for industrial production. Prior in U.S. Pat. No. 6,786,336 discloses a chitosan-coated biosorbent for heavy metal adsorption and its preparation method, which comprises preparing a ceramic support material, preparing a chitosan gel and coating the gel to the ceramic support material. However, in the above invention the chitosan gel without crosslinking treatment was used for coating, resulting in faster degradation of chitosan, which could lead to reduction of adsorptive capability. Prior in U.S. Pat. No. 8,932,983 teaches a chitosan based adsorbent comprising chitosan and one or more ligands chosen from members selected from the group consisting of thioglycolic acid, terephtalic acid, cysteine and cysteine hydrochloride. Although the adsorbent in the above invention exhibits higher adsorptive capacity and selectivity, the use of large quantity of chitosan leads to the heavy cost. CN Pat. No. 201110326390.8 discloses a mercury ion adsorbent and its preparation method, which comprises preparing mixture of chitosan, polyvinyl alcohol and clay composition, preparing gel with glutaraldehyde, preparing solid products by freeze-thaw cycles, rinsing with sodium hydroxide and deionized water separately and dehydrating by anhydrous ethyl alcohol. On one hand, large amount of waste water will be generated during the rising steps, raising environmental issues. On the other hand, the solid products are obtained by the freeze-thaw method, which will put forward higher requirement for equipment and cause large energy consumption, so it is not suitable for industrial production.

To sum up, chitosan-based mercury adsorbents still have some disadvantages, such as high price, large discharges of wastewater and waste gas during production. Without solving these problems, it's difficult to achieve industrialized mass production. Therefore, there is a need for a low cost mercury adsorbent, which can easily be obtained by green synthesis with little amount of waste discharge.

SUMMARY OF THE INVENTION

In order to solve the problems existing in the prior art, the present invention provides an attapulgite-crosslinked chitosan composite mercury adsorbent with high adsorptive capacity and relatively low price. The prepared mercury adsorbent can be applied to the removal of mercury ions in the wastewater owing to the excellent adsorptive property and regeneration performance. Meanwhile, the adopted solid-phase synthetic procedure for preparing the mercury adsorbent is simple, easy to handle, environmental-friendly (almost no waste gas and wastewater emissions) and the product cost is greatly reduced due to the use of attapulgite.

The technical scheme provided by the inventions is as follows:

An attapulgite-crosslinked chitosan composite mercury adsorbent used for removing mercury ions in wastewater is made from 80~90 parts of attapulgite, 4~12 parts of organic acid, 8~30 parts of chitosan, 1~5 parts of glutaraldehyde and 2~4 parts of adhesive.

Specifically, the specific surface area of the attapulgite is in the range of 100~200 m$^2$/g; the organic acid is a polyprotic acid with a molecular weight less than 200 g/mol; the degree of deacetylation of the chitosan is 75~98% and its molecular weight is in the range of $3\times10^5$~$4\times10^5$; the adhesive is one of cellulose-based adhesives, polyol-based adhesives, aqueous polyamide-based adhesives, or aqueous glyoxyuronic acid-based adhesives.

Preferably, the chitosan accounts for 10~30% of the attapulgite in mass; the glutaraldehyde accounts for 12~17% of the chitosan in mass; the adhesive accounts for 3~5% of the attapulgite in mass; the organic acid is chosen from one of the following: citric acid, tartaric acid or malic acid, wherein the mass fraction is 5% after dilution; the adhesive is chosen from one or more of the following: carboxymethylcellulose, hydroxypropylcellulose, polyethylene glycol, polyvinyl pyrrolidone and sodium alginate.

The attapulgite-crosslinked chitosan composite mercury adsorbent in the invention can be applied to the removal of mercury ions in the wastewater due to the excellent adsorptive property and regeneration performance. In addition, the cost of the materials is significantly reduced owing to the addition of attapulgite.

The invention also provides a solid-phase synthetic procedure of an attapulgite-crosslinked chitosan composite mercury removal adsorbent comprising the following steps:

(1) mixing 80&90 parts of attapulgite with 80~90 parts of organic acid solution in a kneader to knead the mixture for 0.5~1 h;

(2) adding 1~3 parts of chitosan and 1~4 parts of organic acid solution into the kneader and keeping kneading for 0.5~1 h;

(3) adding 0.5~2 parts of glutaraldehyde solution (mass fraction: 25%) into the mixture of step (2) and keeping kneading for 0.5~1 h;

(4) repeating steps (2) and (3) 5~10 times, then adding the adhesive to the kneader and keeping kneading for 0.5~1 h;

(5) the obtained clay in the kneading machine is molded in the extruder after vacuum mud milling; and (6) the molded materials are dried at 70~90° C. till constant weight to get the products, wherein the attapulgite is obtained by calcining at 600~700° C. for 3~5 h, grinding and screening through a 200~300 mesh sieve;

wherein the chitosan is gained by grinding and screening through a 80~100 mesh sieve.

The attapulgite-crosslinked chitosan composite mercury adsorbent in the invention is prepared by the method of adding chitosan and glutaraldehyde in batches. Because of the limited solubility of chitosan, batch addition can not only dissolve chitosan, but also minimize the use of organic acid, resulting in less discharge of wastewater and waste gas, which is advantageous to industrial production.

Specifically, the specific surface area of the attapulgite is in the range of 100 to 200 m$^2$/g; the organic acid is a polyprotic acids with a molecular weight less than 200 g/mol; the degree of deacetylation of the chitosan is 75~98% and a molecular weight of $3\times10^5$ to $4\times10^5$; the adhesive is one of cellulose-based adhesives, polyol-based adhesives, aqueous polyamide-based adhesives, or aqueous glyoxyuronic acid-based adhesives.

Preferably, the chitosan accounts for 10~30% of the attapulgite in mass; the glutaraldehyde accounts for 12~17% of the chitosan in mass; the adhesive accounts for 3~5% of the attapulgite in mass; the organic acid is chosen from one of the following: citric acid, tartaric acid or malic acid, wherein the mass fraction is 5% after dilution; the adhesive is chosen from one or more of the following: carboxymethylcellulose, hydroxypropylcellulose, polyethylene glycol, polyvinyl pyrrolidone and sodium alginate.

Preferably, in step (4), after repeating step (2) and (3) for 5~10 times: the accumulative chitosan accounts for 10~30% of the attapulgite in mass, specifically, the chitosan added each time accounts for 10~20% of the total amount of chitosan; the accumulative glutaraldehyde accounts for 12~17% of the chitosan in mass, specifically, the glutaraldehyde added each time accounts for 10~20% of the total amount of glutaraldehyde; the accumulative adhesive accounts for 3~5% of the attapulgite in mass.

Preferably, in the invention, the mass fraction of the glutaraldehyde solution is 25% and the mass fraction of the organic acid is 5%.

Further, in step (6), powder products can be obtained by crushing the molded products and screening.

An attapulgite-crosslinked chitosan composite mercury adsorbent and its solid-phase synthesis procedure is described in the present invention. According to the invention, the mercury adsorbent can be prepared by the following solid-phase synthetic procedure: attapulgite, organic acid solution are mixed in a kneader, followed by adding chitosan in batch, kneading and dissolving by the acid in the mud, then glutaraldehyde is introduced to trigger the crosslinking reaction. The above steps containing the addition of chitosan and glutaraldehyde are repeated several times until the mass ratio between the chitosan and attapulgite reaches (1~3):10. Next, a small amount of adhesive is mixed with the above materials and finally the products are obtained through molding, drying or crushing into powders. The synthetic procedure is simple and easy to handle. Meanwhile, due to the low energy consumption and almost no waste gas and wastewater discharges, it is suitable for large-scale industrial production. The adsorption capacity of the mercury adsorbent can achieve nearly 300 mg/g with a regeneration rate of 70%.

The attapulgite-crosslinked chitosan composite mercury adsorbent and its solid-phase synthesis process according to the present invention, wherein the advantageous effects are as follows: (1) using attapulgite as the main component and the method of batch addition lead to low cost, simple process and little wastewater and waste gas; (2) solid products are prepared by drying instead of freeze-drying, resulting in the lower requirement of the production equipment and lower energy consumption; (3) the adsorption capacity of the prepared adsorbent can reach nearly 300 mg/g, and the regeneration rate is up to 70%.

DETAILED DESCRIPTION

The principles and features of the present invention will be described in the following, which are intended to be illustrative only and are not intended to limit the scope of the present invention.

Carrying out the practice of the embodiments provided by the present invention, wherein:

The adsorptive capacity of the mercury adsorbent according to the present invention is determined by the static adsorption method using the following steps:

1 g of samples are placed into 200 mL mercuric chloride solution (100 ppm, pH 5). The solution is stirred at room temperature for 2 h. The sample is filtered out and then added into another beaker of mercuric chloride solution for continuing adsorption. The above steps are repeated until adsorptive saturation.

The regeneration capacity of the mercury adsorbent according to the present invention is tested by the following method:

Adding 1 g saturated samples into 100 mL 2% HCl solution and stirring at room temperature for 4~6 h. Then the sample is filtered, rinsed with deionized water three times and transferred into 100 mL 1% NaOH solution. After 1 h, the sample is filtered, rinsed with deionized water and dried at 80° C. The adsorptive capacity of the regenerated sample is evaluated using the method described above.

The procedures and results are shown in embodiments 1~5.

Embodiment 1

A method for preparing an attapulgite adsorbent for removing mercury ions in waste water comprises the following steps:

(1) pretreatment of raw materials: calcining 80 parts of attapulgite at 600° C. for 5 h, cooling and grinding followed by screening through a 200~300 mesh sieve; grinding chitosan and collecting powders after screening through a 80~100 mesh sieve;
(2) mixing attapulgite in step (1) with 80 parts of citric acid solution in a kneader and keeping kneading for 1 h;
(3) adding 1.6 parts of chitosan and 2 parts of citric acid solution in a kneader, and keeping kneading for 0.5~1 h;
(4) adding 1 parts of glutaraldehyde solution (mass fraction: 25%) to the mixture of step (3) and keeping kneading for 1 h, wherein the glutaraldehyde accounted for 16% of chitosan in mass;
(5) repeating steps (3) and (4) 7 times so that the accumulative mass of chitosan reached around 20% of the mass of the attapulgite and the accumulative mass of glutaraldehyde was 16% of chitosan's;
(6) adding 1.2 parts of carboxymethyl cellulose and 1.2 parts of sodium alginate as adhesive and keeping kneading for 1 h, wherein the adhesive accounted for 3% of attapulgite in mass;
(7) the obtained clay in the kneading machine was molded in the extruder after vacuum mud milling to form columnar products, which were then dried at 80° C.

According to the data collected by static adsorption method, the adsorptive capacity of the adsorbent in 100 ppm mercuric chloride solution was 158.2 mg/g. After regeneration, the adsorptive capacity was 112.3 mg/g and the regeneration rate was 71.0%.

Embodiment 2

A method for preparing an attapulgite adsorbent for removing mercury ions in waste water comprises the following steps:

(1) pretreatment of raw materials: calcining 80 parts of attapulgite at 600° C. for 5 h, cooling and grinding followed by screening through a 200~300 mesh sieve; grinding chitosan and collecting powders after screening through a 80~100 mesh sieve;
(2) mixing attapulgite in step (1) with 80 parts of citric acid solution in a kneader and keeping kneading for 1 h;
(3) adding 2.4 parts of chitosan and 3 parts of citric acid solution into the kneader, and keeping kneading for 0.5~1 h;
(4) adding 1.3 parts of glutaraldehyde solution (mass fraction: 25%) to the mixture of step (3) and keeping kneading for 0.5 h, wherein the glutaraldehyde accounted for 14% of chitosan in mass;
(5) repeating steps (3) and (4) 5 times so that the accumulative mass of chitosan reached around 15% of the mass of the attapulgite and the accumulative mass of glutaraldehyde was 14% of chitosan's;
(6) adding 2.4 parts of carboxymethyl cellulose as adhesive and keeping kneading for 1 h, wherein the adhesive accounted for 3% of attapulgite in mass;
(7) the obtained clay in the kneading machine was molded in the extruder after vacuum mud milling to form columnar products, which were then dried at 80° C.

According to the data collected by static adsorption method, the adsorptive capacity of the adsorbent in 100 ppm mercuric chloride solution was 185.6 mg/g. After regeneration, the adsorptive capacity was 133.6 mg/g and the regeneration rate was 72.0%.

Embodiment 3

A method for preparing an attapulgite adsorbent for removing mercury ions in waste water comprises the following steps:

(1) pretreatment of raw materials: calcining 80 parts of attapulgite at 600° C. for 5 h, cooling and grinding followed by screening through a 80~100 mesh sieve; grinding chitosan and collecting powders after screening through a 80~100 mesh sieve;
(2) mixing attapulgite in step (1) with 80 parts of citric acid solution in a kneader and keeping kneading for 0.5 h;
(3) adding 2.4 parts of chitosan with 3 parts of tartaric acid solution in a kneader and keeping kneading for 0.5 h;
(4) adding 1.4 parts of glutaraldehyde solution (mass fraction:25%) to the mixture of step (3) and keeping kneading for 0.5 h, wherein the glutaraldehyde accounted for 15% of chitosan in mass;
(5) repeating steps (3) and (4) 7 times so that the accumulative mass of chitosan reaches around 20% of the mass of the attapulgite and the accumulative mass of glutaraldehyde was 15% of chitosan's;
(6) adding 1.2 parts of poly(ethylene glycol) and 1.2 parts of polyvinyl pyrrolidone into the kneader and keeping kneading for 0.5 h, wherein the adhesive accounted for 3% of attapulgite in mass;
(7) the obtained clay in the kneading machine was molded in the extruder after vacuum mud milling to form honeycomb-shaped products, which were then dried at 80° C.

According to the data collected by static adsorption method, the adsorptive capacity of the adsorbent in 100 ppm mercuric chloride solution was 216.8 mg/g. After regeneration, the adsorptive capacity was 147.4 mg/g and the regeneration rate was 68.0%.

Embodiment 4

A method for preparing an attapulgite adsorbent for removing mercury ions in waste water comprises the following steps:

(1) pretreatment of raw materials: calcining 80 parts of attapulgite at 650° C. for 4 h, cooling and grinding followed by screening through a 200~300 mesh sieve; grinding chitosan and collecting powders after screening through a 80~100 mesh sieve;

(2) mixing attapulgite in step (1) with 80 parts of citric acid solution in a kneader and keeping kneading for 1 h;

(3) adding 4 parts of chitosan and 5 parts of citric acid solution into the kneader, and keeping kneading for 1 h;

(4) adding 2 parts of glutaraldehyde solution (mass fraction: 25%) to the mixture of step (3) and keeping kneading for 0.5~1 h, wherein the glutaraldehyde accounted for 12% of chitosan in mass;

(5) repeating steps (3) and (4) 5 times so that the accumulative mass of chitosan reached around 25% of the mass of the attapulgite and the accumulative mass of glutaraldehyde was 12% of chitosan's;

(6) adding 3.2 parts of polyvinyl pyrrolidone as adhesive and keeping kneading for 0.5~1 h, wherein the adhesive accounted for 4% of attapulgite in mass;

(7) the obtained clay in the kneading machine was molded in the extruder after vacuum mud milling to form columnar products, which were then dried at 80° C.

According to the data collected by static adsorption method, the adsorptive capacity of the adsorbent in 100 ppm mercuric chloride solution was 243.5 mg/g. After regeneration, the adsorptive capacity was 165.1 mg/g and the regeneration rate was 67.8%.

Embodiment 5

A method for preparing an attapulgite adsorbent for removing mercury ions in waste water comprises the following steps:

(1) pretreatment of raw materials: calcining 80 parts of attapulgite at 700° C. for 3 h, cooling and grinding followed by screening through a 200~300 mesh sieve; grinding chitosan and collecting powders after screening through a 80~100 mesh sieve;

(2) mixing attapulgite in step (1) and 80 parts of citric acid solution in a kneader and keeping kneading for 0.5 h;

(3) adding 2.4 parts of chitosan and 3 parts of citric acid solution to the kneader, and keeping kneading for 0.5~1 h;

(4) adding 1.5 parts of glutaraldehyde solution to the mixture of step (3) and keeping kneading for 0.5~1 h, wherein the glutaraldehyde accounted for 15% of chitosan in mass;

(5) repeating steps (3) and (4) 10 times so that the accumulative mass of chitosan reaches around 30% of the mass of the attapulgite and the accumulative mass of glutaraldehyde was 16% of chitosan's;

(6) adding 4 parts of hydroxypropyl cellulose into the kneader and keeping kneading for 0.5~1 h, wherein the adhesive accounted for 5% of attapulgite in mass;

(7) the obtained clay in the kneading machine was molded in the extruder after vacuum mud milling to form spherical products;

(8) the spherical products were then dried at 80° C. to constant weight, crushed and screened to get powder products.

According to the data collected by static adsorption method, the adsorptive capacity of the adsorbent in 100 ppm mercuric chloride solution was 287.1 mg/g. After regeneration, the adsorptive capacity was 186.6 mg/g and the regeneration rate was 65.0%.

The descriptions above are only preferred embodiments of the present invention and are not used to restrict the present invention. Any modifications, equivalent substitutions, improvements etc. within the spirit and principles of the present invention shall be considered as included in the scope of protection of the present invention.

What is claimed is:

1. A solid-phase synthetic procedure of an attapulgite-crosslinked chitosan composite mercury removal adsorbent, comprising:
   (1) mixing 80~90 parts of attapulgite with 80~90 parts of organic acid solution in a kneader to knead the mixture for 0.5~1 h;
   (2) adding 1~3 parts of chitosan and 1~4 parts of organic acid solution into the kneader and keeping kneading for 0.5~1 h;
   (3) adding 0.5~2 parts of glutaraldehyde solution into the mixture of step (2) and keeping kneading for 0.5~1 h, wherein a mass fraction of the glutaraldehyde solution is 25%;
   (4) repeating steps (2) and (3) 5~10 times, then adding the adhesive to the kneader and keeping kneading for 0.5~1 h;
   (5) the obtained clay in the kneading machine is molded in the extruder after vacuum mud milling; and
   (6) the molded materials are dried at 70~90° C. till constant weight to get the products, wherein the attapulgite is obtained by calcining at 600~700° C. for 3~5 h, grinding and screening through a 200~300 mesh sieve,
   wherein the chitosan is gained by grinding and screening through a 80~100 mesh sieve.

2. The solid-phase synthetic procedure of an attapulgite-crosslinked chitosan composite mercury removal adsorbent according to claim 1, wherein a specific surface area of the attapulgite is in the range of 100 to 200 m$^2$/g; the organic acid solution is a polyprotic acid; the chitosan has a degree of deacetylation of 75~98% and a molecular weight of 3×10$^5$ to 4×10$^5$; and the adhesive is one of cellulose-based adhesives, polyol-based adhesives, aqueous polyamide-based adhesives, or aqueous glyoxyuronic acid-based adhesives.

3. The solid-phase synthetic procedure of an attapulgite-crosslinked chitosan composite mercury removal adsorbent according to claim 2, wherein a mass fraction of the organic acid is 5% after dilution, and the organic acid is chosen from one of the following: citric acid, tartaric acid or malic acid; and the adhesive is chosen from one or more of the following: carboxymethylcellulose, hydroxypropylcellulose, polyethylene glycol, polyvinyl pyrrolidone and sodium alginate.

4. The solid-phase synthetic procedure of an attapulgite-crosslinked chitosan composite mercury removal adsorbent according to claim 3, wherein after repeating step (2) and (3) for 5~10 times as in mentioned step (4), the accumulative chitosan accounts for 10~30% of the attapulgite in mass, the accumulative glutaraldehyde accounts for 12~17% of the chitosan in mass, and the accumulative adhesive accounts for 3~5% of the attapulgite in mass.

5. The solid-phase synthetic procedure of an attapulgite-crosslinked chitosan composite mercury removal adsorbent according to claim 2, wherein in step (6), powder products can be obtained by crushing the molded products and screening.

6. The solid-phase synthetic procedure of the attapulgite-crosslinked chitosan composite mercury removal adsorbent according to claim 3, wherein in step (6), powder products can be obtained by crushing the molded products and screening.

7. The solid-phase synthetic procedure of the attapulgite-crosslinked chitosan composite mercury removal adsorbent according to claim 4, wherein in step (6), powder products can be obtained by crushing the molded products and screening.

\* \* \* \* \*